United States Patent
Allen et al.

(10) Patent No.: US 7,933,096 B2
(45) Date of Patent: Apr. 26, 2011

(54) LAYERED RETURN POLES FOR MAGNETIC WRITE HEADS

(75) Inventors: Donald G. Allen, Morgan Hill, CA (US); Hieu Lam, Milpitas, CA (US); Terence Tin-Lok Lam, Cupertino, CA (US); Steve C. Puga, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 789 days.

(21) Appl. No.: 12/005,558

(22) Filed: Dec. 26, 2007

(65) Prior Publication Data

US 2009/0168260 A1 Jul. 2, 2009

(51) Int. Cl.
*G11B 5/33* (2006.01)
(52) U.S. Cl. .................................. 360/125.26
(58) Field of Classification Search ............. 360/125.26, 360/317, 125.12, 125.06, 125.3, 125.14, 360/125.16

See application file for complete search history.

(56) References Cited

U.S. PATENT DOCUMENTS

| | | | |
|---|---|---|---|
| 4,242,710 A | 12/1980 | Hempstead et al. | |
| 4,279,707 A | 7/1981 | Anderson et al. | |
| 6,794,063 B2 | 9/2004 | Okada et al. | |
| 6,912,771 B2 | 7/2005 | Dinan et al. | |
| 2003/0048582 A1 | 3/2003 | Kanada et al. | |
| 2010/0214692 A1* | 8/2010 | Kief et al. | 360/125.03 |
| 2010/0302681 A1* | 12/2010 | Mino et al. | 360/125.03 |

* cited by examiner

*Primary Examiner* — Allen T Cao
(74) *Attorney, Agent, or Firm* — Lorimer Labs; D'Arcy H. Lorimer (57) ABSTRACT

Methods and structures for the fabrication of both thin film longitudinal and perpendicular write heads are disclosed. A unique feature of these write heads is the inclusion of layered return poles, which comprise alternating layers of 22/78 and 80/20 NiFe alloys. The alternating layers also vary in thickness, the 22/78 NiFe layers having a nominal thickness of 1500 angstroms and the 80/20 NiFe layers having a nominal thickness of about 75 angstroms. Head efficiency and signal to noise ratios are significantly improved in heads having layered return pole construction.

22 Claims, 8 Drawing Sheets

LAYERED RETURN POLES FOR MAGNETIC WRITE HEADS

BACKGROUND OF THE INVENTION

1. Field of the Invention

This invention relates to structures and methods for fabricating magnetic write heads. More specifically, the invention relates to structures and methods for fabricating thin film longitudinal and perpendicular magnetic write heads having layered return poles.

2. Description of the Related Art

Figure 1:
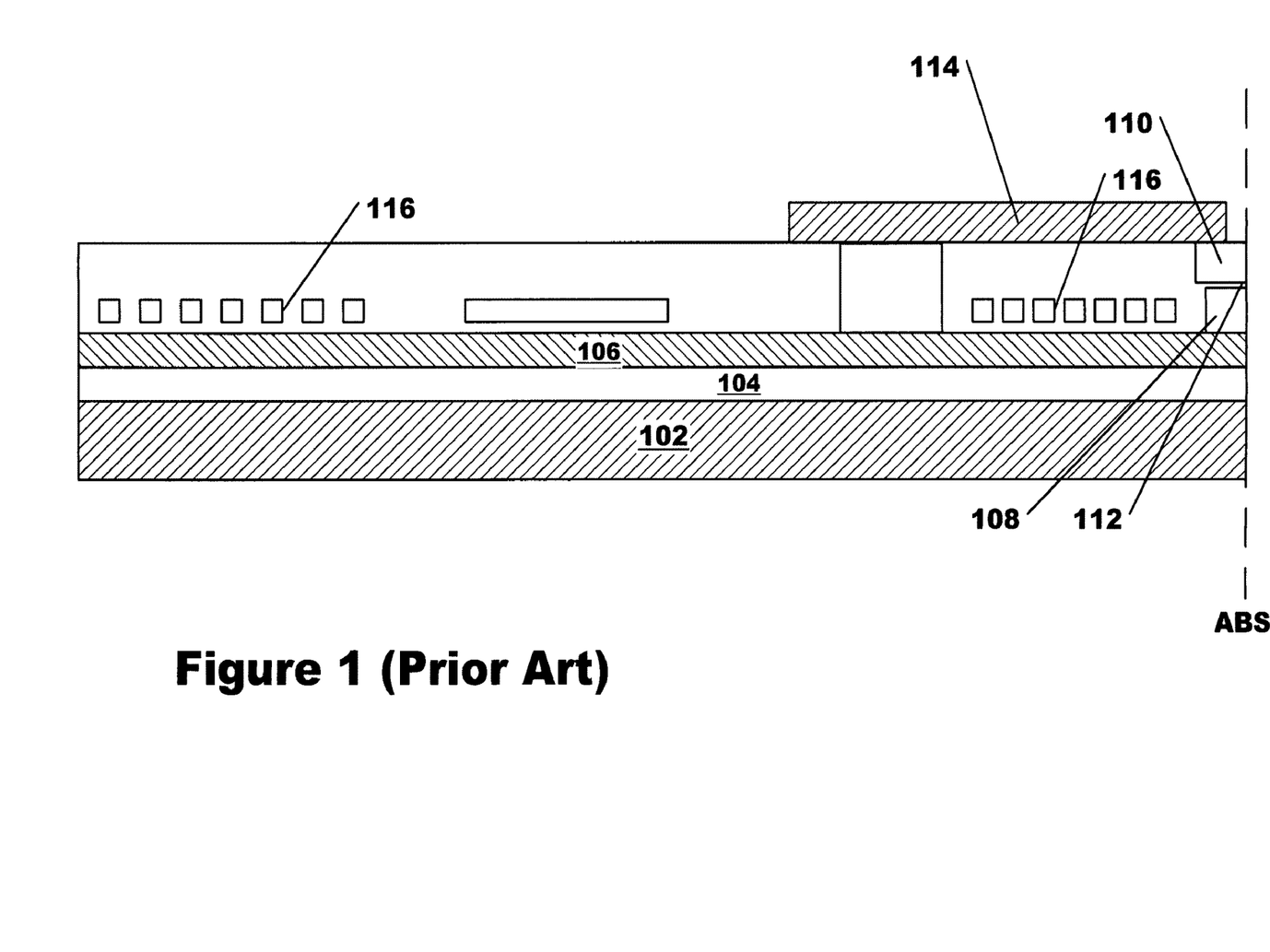
FIG. 1 (Prior Art) is a partial cross sectional view of a longitudinal write head.

FIG. 1 (Prior Art) is a partial cross sectional view of a typical thin film longitudinal head, wherein write gap 112 is bounded by upper 110 and lower 108 pole tips. Upper pole tip 110 is in contact with upper return pole layer 114. Lower pole tip 108 is in contact with lower return pole layer 106. Lower return pole layer is separated from shield layer 102 by insulating layer 104. The coil is shown as structure 116.

Typically, layered pole structures (structures with alternating layers of different compositions of materials) in prior art longitudinal write heads have been limited to upper pole tip 110 and lower pole tip 108, as disclosed, for example in US Patent Application Publication 2003/0048582, FIG. 3. Return pole layers (106, 114) have been generally comprised of a magnetic alloy of uniform composition, for example 45% Ni, 55% Fe. Dinan et al., U.S. Pat. No. 6,912,771, discloses upper and lower return poles having a graduated Fe concentration varying from about 20 atomic % to about 55-65 atomic %. However, unlike the embodiment disclosed in FIG. 1, there are no distinct pole tips 110, 108 disclosed in Dinan, as the return poles extend to the ABS and have the write gap directly between them. Dinan does not disclose any improved head performance, except to point out that the graduated Fe concentration can be produced in a single electroplating bath, reducing fabrication costs.

Figure 2:
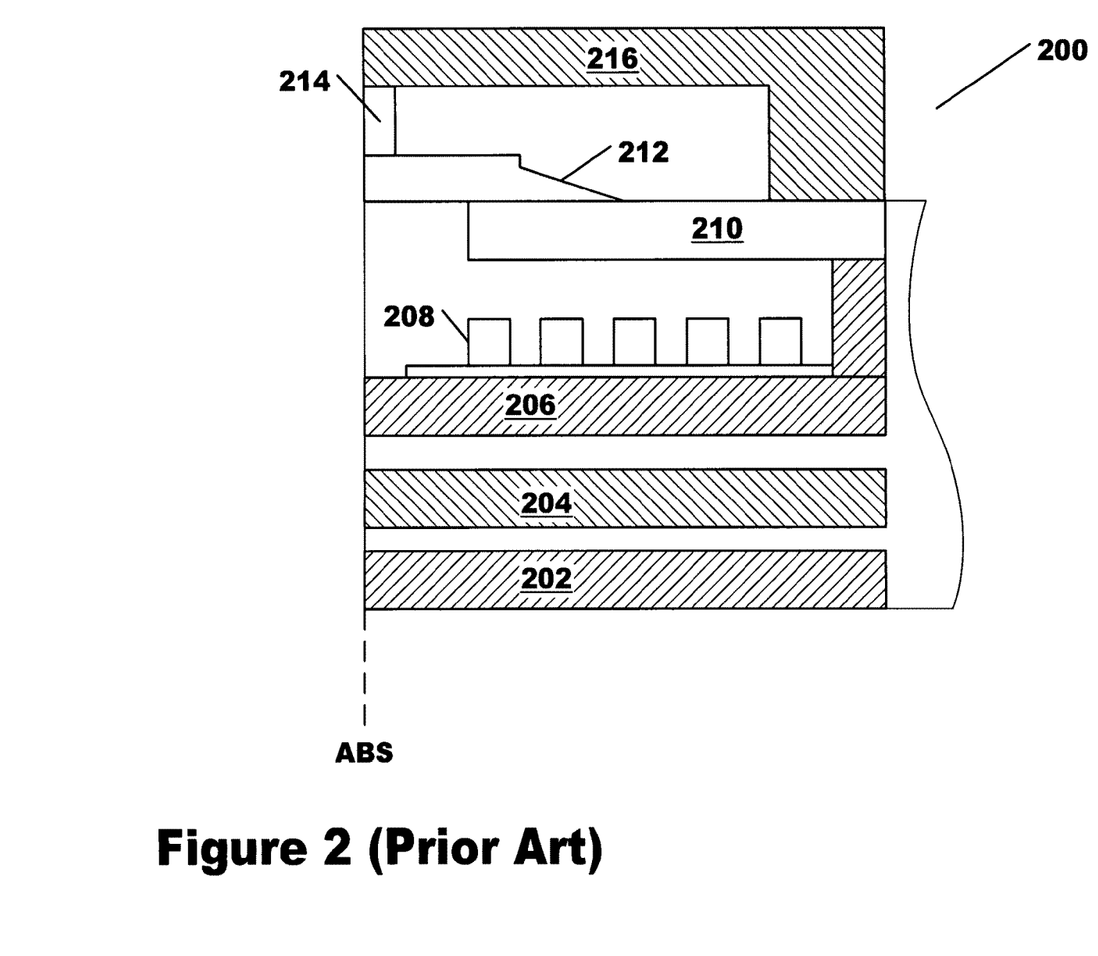
FIG. 2 (Prior Art) is a partial cross sectional view of a perpendicular write head.

FIG. 2 (Prior Art) is a partial, cross sectional view of a thin film perpendicular write head 200. The head comprises shield layers 202, 204, shaping layer 210, coil structure 208, main pole 212, lower return pole layer 206, wrap around shield 214, and upper return pole layer 216. Alternatively, structure 214 may also be a trailing shield. Details of wrap around shields and trailing shields, as applied to perpendicular recording heads, can be found in, for example, US Patent Application Publications 2007/0146930, 2007/0115584, 2006/0174474, 2006/0044682, and 2007/0137027. Typically, lower return pole layer 206 and upper return pole layer 216 are composed of a magnetic material of uniform composition. Layered structures, comprising alternating layers of different compositions, have yet be employed in upper and lower return poles in perpendicular heads of the prior art.

While thin film write heads of the prior art can provide adequate performance, what is needed is a better write head structure that can provide higher efficiency and lower noise for both longitudinal and perpendicular heads.

United States Patent Application Publication 2003/0048582 discloses an upper magnetic pole layer and/or lower magnetic pole layer comprising a soft magnetic film having a variable region in which the chemical composition of Fe changes in the direction of thickness in at least a part thereof, and the difference of the proportions of Fe between the regions most abundant in Fe and most deficient in Fe is 4% by mass or more in the variable region. The structure of the soft magnetic film permits the saturation magnetic flux density Bs to be improved while decreasing the coercive force Hc by forming fine crystal grains, thereby enabling a thin film magnetic head excellent in high density recording to be manufactured.

U.S. Pat. No. 6,912,771 discloses a magnetic head for a hard disk drive. The magnetic poles of the head are formed with a NiFe alloy having a graduated composition in which a higher Fe concentration is fabricated proximate the write gap layer between the magnetic poles. Each magnetic pole is fabricated in a single electroplating step in which the duty cycle of the electroplating current is altered during the electroplating operation. Where the duty cycle is greatest the Fe ion concentration is likewise greatest.

U.S. Pat. No. 6,794,063 discloses a thin film magnetic head having sufficient recording performance on a recording medium imparted with a large coercive force. A plated magnetic thin film can be obtained in which a crystal grain size is modulated in a film thickness direction and a coercive force is reduced. Further, even for a composition area indicating a high saturation magnetic flux density in which, conventionally, soft magnetic properties could not be obtained, a magnetic film having an excellent soft magnetic property can be manufactured.

U.S. Pat. No. 4,279,707 discloses that electroplating nickel-iron alloys onto objects having complex topographical shapes with projections and hollows such as upper pole pieces of thin film magnetic recording heads has been found to yield a substantial variation in nickel-iron alloy composition from point to point within a single pattern. Providing a low total dischargeable ion concentration in the bath is helpful to reduce such variations when plating in the 80:20 Ni:Fe alloy range.

U.S. Pat. No. 4,242,710 discloses a thin film inductive head formed with nickel-iron binary alloy or nickel-iron-X ternary alloy pole pieces characterized by negative magnetostriction having a saturation magnetostriction coefficient in the range of $1\times10^{-6}$ to $5\times10^{-6}$.

SUMMARY OF THE INVENTION

It is an object of the present invention to provide a thin film perpendicular magnetic head including a shield structure and, an upper return pole layer, magnetically coupled to the shield structure, the upper return pole layer containing a plurality of alternating layers of a first magnetic alloy and a second magnetic alloy, layers of the first magnetic alloy having a first thickness, layers of the second magnetic alloy having a second thickness, the first magnetic alloy having an Fe concentration less than 21% by weight, the second magnetic alloy having an Fe concentration greater than 75% by weight, the second thickness greater than 20 times the first thickness.

It is another object of the present invention to provide a thin film longitudinal magnetic head including an upper pole tip; a lower pole tip; a back gap structure; an upper return pole layer magnetically coupling the upper pole tip to said back gap structure, the upper return pole layer comprising a plurality of alternating layers of a first magnetic alloy and a second magnetic alloy, layers of the first magnetic alloy having a first thickness, layers of the second magnetic alloy having a second thickness, the first magnetic alloy having an Fe concentration less than 21% by weight, the second magnetic alloy having an Fe concentration greater than 75% by weight, the second thickness greater than 20 times the first thickness; and, a lower return pole layer magnetically coupling the lower pole tip to the back gap structure.

It is another object of the present invention to provide a thin film perpendicular magnetic head including a shield structure and, an upper return pole layer, magnetically coupled to the shield structure, the upper return pole layer comprising a plurality of alternating layers of a first NiFe magnetic alloy and a second NiFe magnetic alloy, layers of the first NiFe magnetic alloy having a thickness between about 50 and 125 angstroms, layers of the second NiFe magnetic alloy having a thickness between about 1000 and 1500 angstroms, the first NiFe magnetic alloy having a composition between about 78.8% Ni, 21.2% Fe and 84.8% Ni, 15.2% Fe by weight, the second NiFe magnetic alloy having a composition between about 18.3% Ni, 81.7% Fe and 23.3% Ni, 76.7% Fe by weight.

It is yet another object of the present invention to provide a thin film longitudinal magnetic head including an upper pole tip; a lower pole tip; a back gap structure; an upper return pole layer magnetically coupling the upper pole tip to the back gap structure, the upper return pole layer comprising a plurality of alternating layers of a first NiFe magnetic alloy and a second NiFe magnetic alloy, layers of the first NiFe magnetic alloy having a first thickness between about 50 and 125 angstroms, layers of the second NiFe magnetic alloy having a second thickness between about 1000 and 1500 angstroms, the first NiFe magnetic alloy having a composition between about 78.8% Ni, 21.2% Fe and 84.8% Ni, 15.2% Fe by weight, the second NiFe magnetic alloy having a composition between about 18.3% Ni, 81.7% Fe and 23.3% Ni, 76.7% Fe by weight; and, a lower return pole layer magnetically coupling the lower pole tip to the back gap structure, wherein the lower return pole layer comprises a plurality of alternating layers of the first magnetic alloy and the second magnetic alloy, layers of the first magnetic alloy having the first thickness, and layers of the second magnetic alloy having the second thickness.

BRIEF DESCRIPTION OF THE DRAWINGS

The present invention will be better understood when consideration is given to the following detailed description thereof Such description makes reference to the annexed drawings, wherein.

DETAILED DESCRIPTION OF THE PREFERRED EMBODIMENTS

FIGS. 1 and 2 (Prior Art) have been discussed above.

Figure 3:
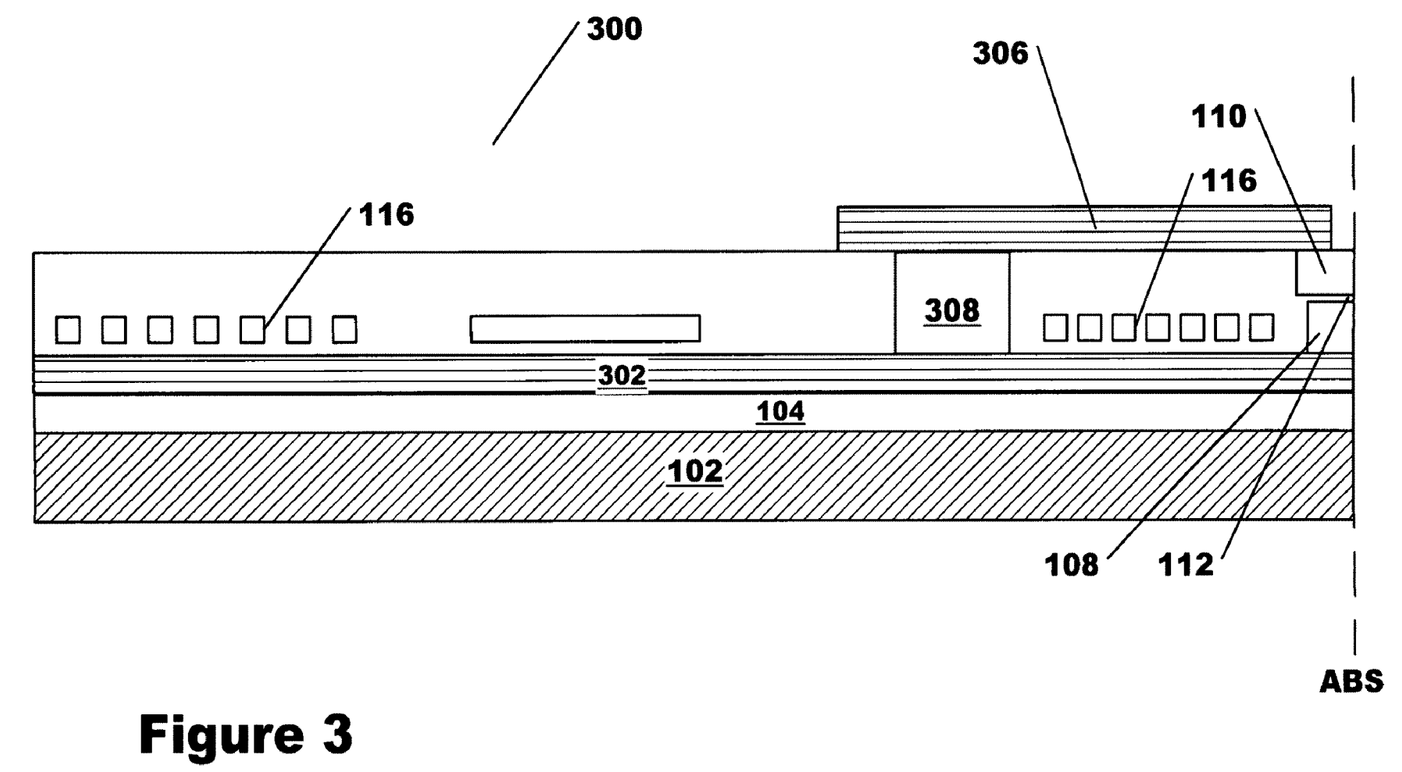
FIG. 3 is a partial cross sectional view of a longitudinal write head, in accordance with an embodiment of the present invention.

FIG. 3 is a partial cross sectional view 300 of a longitudinal write head, in accordance with an embodiment of the present invention. The head comprises shield layer 102, insulating layer 104, lower return pole layer 302, lower pole tip 108, gap layer 112, upper pole tip 110, upper return pole 306, back gap structure 308, and coil structure 116. The present invention of FIG. 3 contains unique features not present in head designs of the prior art. Firstly, upper return pole layer 306 is constructed of alternating layers of magnetic alloys having different compositions and thickness. The specific compositions and structure are discussed in further detail below. Optionally, lower return pole layer 302 may be of layered construction as well, or it can be constructed of a single magnetic alloy. The layered return pole construction, particularly for the upper return pole, provides significant performance improvements for the magnetic head. These performance improvements include higher signal to noise ratios as well as improved write efficiency, which means that signal saturation levels are reached at lower write currents (see below for further details). The performance improvements of the layered return poles come at a low cost, because these layers can be deposited by a single plating bath in situ, wherein the composition variation of the layers is obtained by adjusting the current density during deposition.

Figure 4:
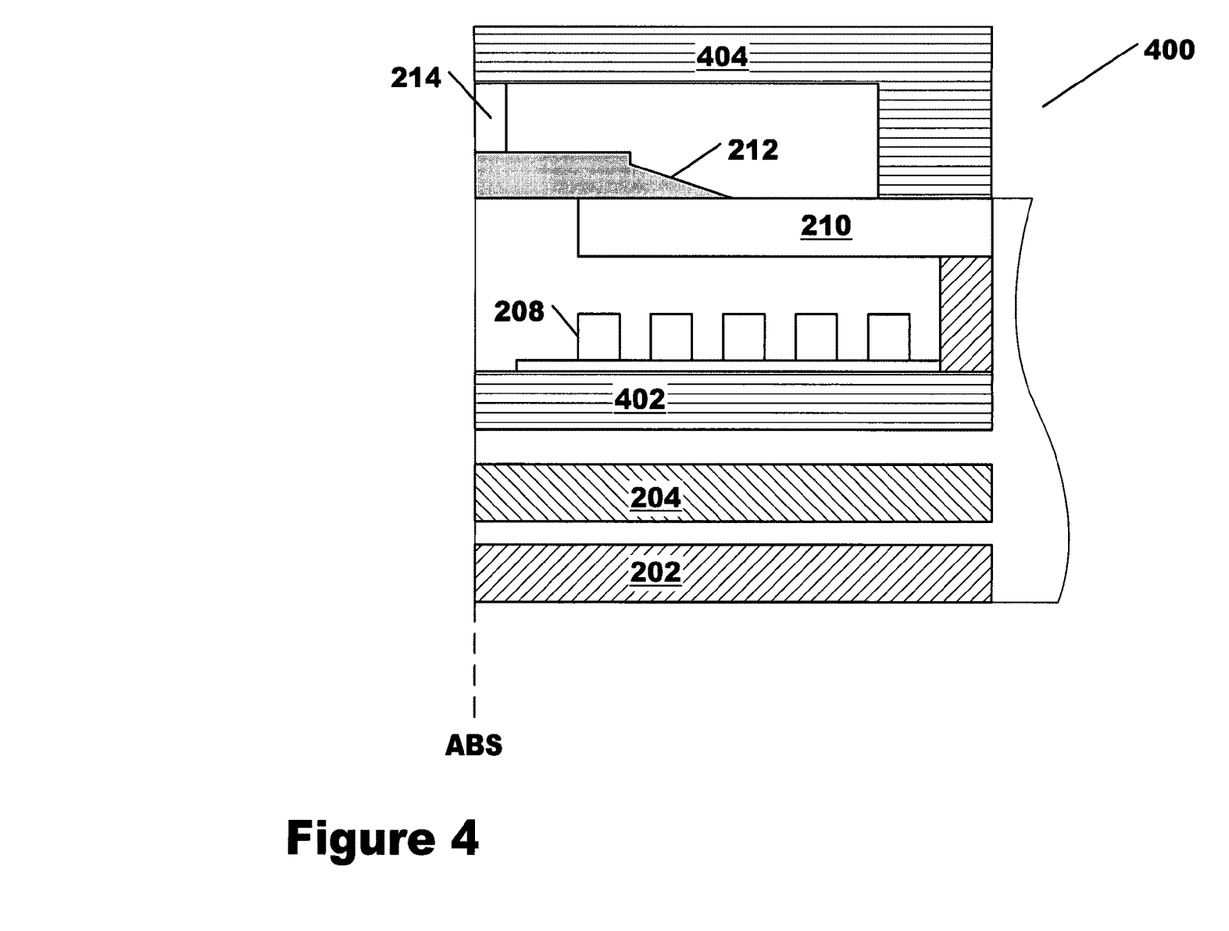
FIG. 4 is a partial cross sectional view of a perpendicular write head, in accordance with an embodiment of the present invention.

FIG. 4 is a partial cross sectional view 400 of a perpendicular write head, in accordance with an embodiment of the present invention. The head comprises shield layers 202, 204, lower return pole layer 402, shaping layer 210, coil structure 208, main pole 212, shield structure 214, and upper return pole layer 404. Structure 214 may be a trailing shield or wrap around shield, in accordance with designs well known to those skilled in the art. As disclosed in embodiments of the present invention, layered construction return poles may also be applied to perpendicular head designs for both layers 404 and 402. Alternatively, only one of the return pole layers 404 or 402 may be constructed of alternating layers. Specific details of the materials and construction are provided below.

Figure 5:
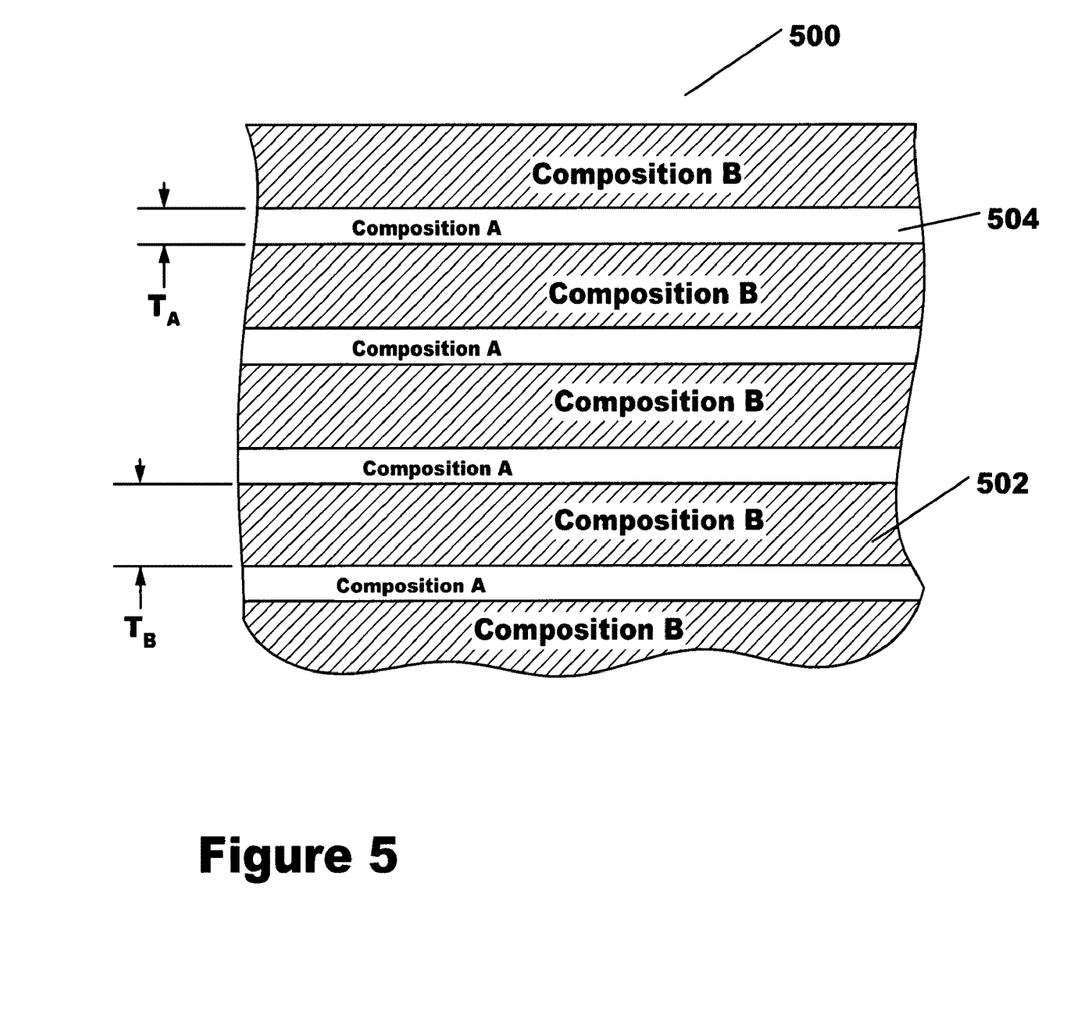
FIG. 5 is a partial cross sectional view of a layered return pole structure, in accordance with embodiments of the present invention.

FIG. 5 is a partial cross sectional view 500 of a layered return pole structure, in accordance with embodiments of the present invention. This construction may be applied to any or all of layers 302, 306, 402, and 404 disclosed above. The layered return pole structure comprises alternating layers 502, 504 having composition A of thickness $T_A$, and composition B of thickness $T_B$. The alloys for both layers 502 and 504 are composed of Ni and Fe. Composition A is preferably 81.8% Ni, 18.2% Fe (by weight), commonly referred to as an 80/20 NiFe alloy. The 18.2% Fe is a nominal concentration, and may vary by ±3.0% Fe, giving the acceptable range of composition A of 78.8% Ni, 21.2% Fe to 84.8% Ni, 15.2% Fe. Thickness $T_A$ can vary from about 50 to 125 angstroms, but is preferably between 50 and 75 angstroms, most preferably about 75 angstroms. Composition B is preferably 20.8% Ni, 79.2% Fe (by weight), commonly referred to as a 22/78 NiFe alloy. The 79.2% Fe is a nominal concentration, and may vary by ±2.5% Fe, giving the acceptable range of composition B of 18.3% Ni, 81.7% Fe to 23.3% Ni, 76.7% Fe. Thickness $T_B$ can vary from about 1000 angstroms to 1500 angstroms, but is preferably about 1500 angstroms. This combination of layers produces a return pole layer having high μ, low $H_c$, and low $H_k$. As previously mentioned, this layered structure can be electroplated form a single electroplating bath by varying the current density. A bath set up to electroplate the 22/78 NiFe alloy is generally used, and the current density is altered to deposit the 80/20 NiFe alloy. For example, at a current density of about 2 mA/cm2, an 92.7% Ni, 7.3% Fe layer can be deposited. At a current density of about 3 mA/cm2, an 81.4% Ni, 18.6% Fe layer can be deposited. At a current density of about 4 mA/cm2, an 52.6% Ni, 47.4% Fe layer can be deposited. Higher current densities would produce the 22/78 NiFe layers. As can be seen from these results, the alternating layered structure of FIG. 5 can be produced from a single electroplating bath which allows a manufacturer to employ the layered return pole structures at little or no cost increase over conventional electroplating of a single uniform composition. Although alternative deposition techniques, such as sputtering, can be employed to deposit the same layered structure, the required composition variation would require deposition of alternating layers in different process chambers, significantly increasing process time and cost, and are therefore less desirable.

Figure 6:
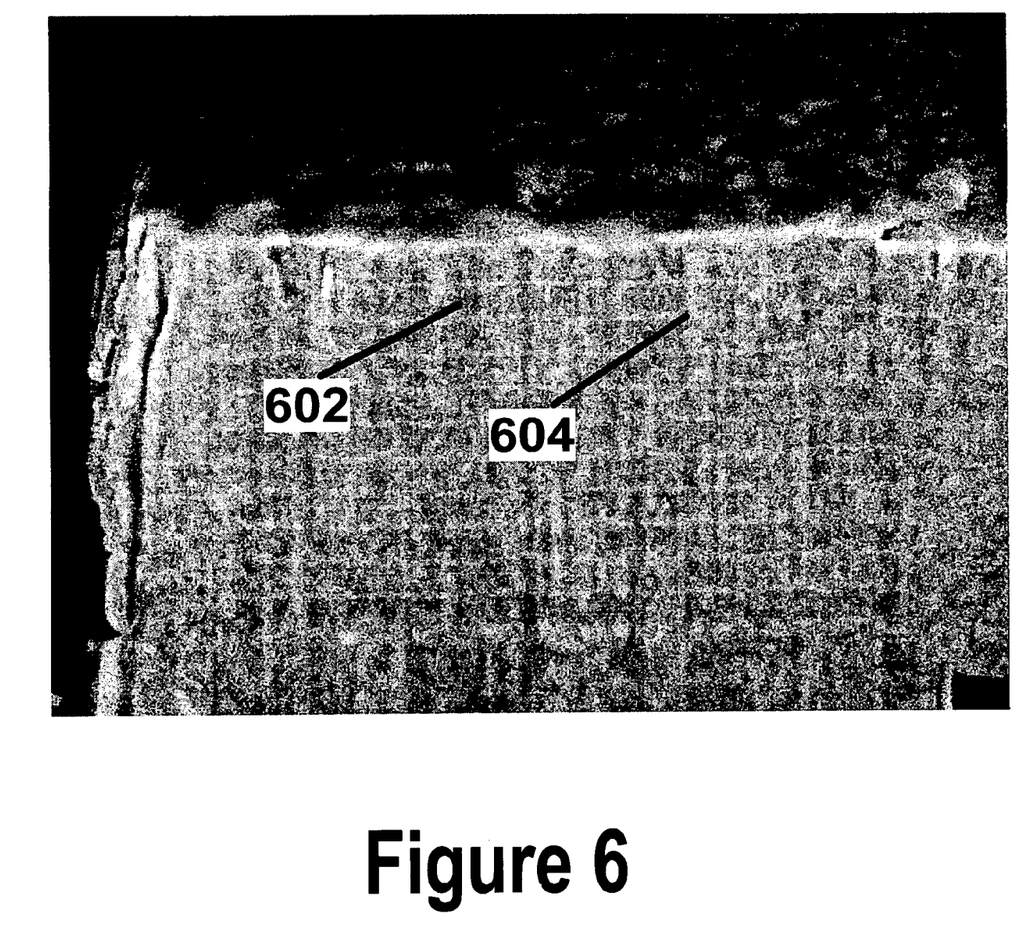
FIG. 6 is a photo-micrograph of an upper layered return pole structure, in accordance with an embodiment of the present invention.

FIG. 6 is a photo-micrograph of an upper layered return pole structure, in accordance with an embodiment of the present invention. The thin, light density layers 604 in the photo-micrograph are composition A (80/20 NiFe alloy), having a thickness of about 75 angstroms. The thicker, darker layers 602 are composition B (22/78 NiFe alloy), having a thickness of about 1500 angstroms.

Figure 7:
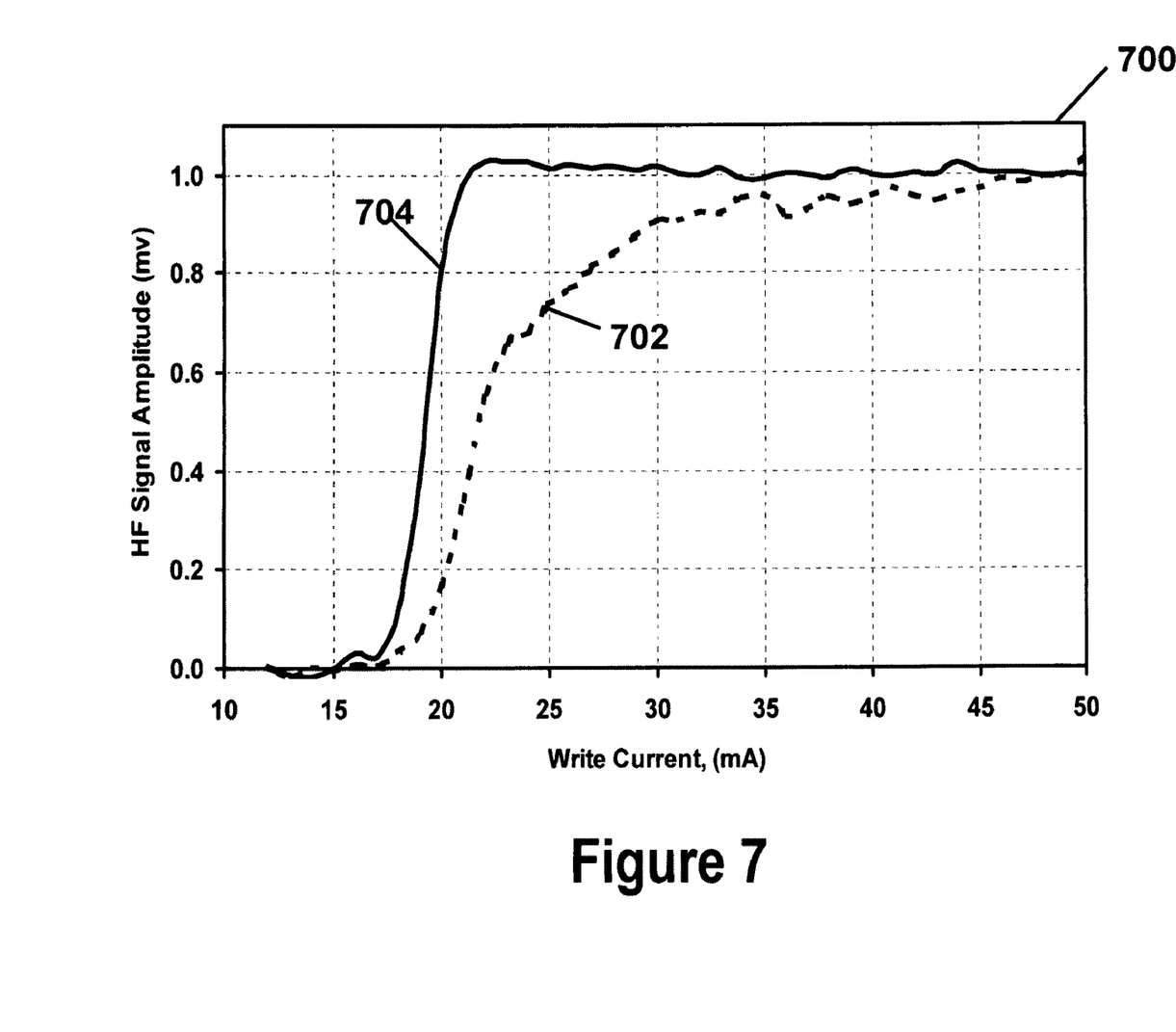
FIG. 7 is a graph of high frequency amplitude versus write current, in accordance with an embodiment of the present invention; and, FIG. 8 is a graph of low frequency signal amplitude versus write current, in accordance with an embodiment of the present invention.

FIG. 7 is a graph 700 of high frequency signal amplitude versus write current, in accordance with an embodiment of the present invention. FIG. 7 provides a comparison of recorded high frequency signal amplitude, as a function of write current, for a longitudinal head of the present invention having a layered upper return pole (curve 704), with that of a conventionally constructed upper return pole of uniform (non-layered) alloy composition (curve 702). Curve 704 illustrates that the high frequency signal amplitude reaches the saturation level of about 1 mV at a write current of about 21 mA, whereas the conventional write head (curve 702) does not reach the 1 mV saturation level until the write current has reached about 46 mA. At about 22 mA write current, the conventional head cannot produce high frequency signal levels above about 0.4 mV.

Figure 8:
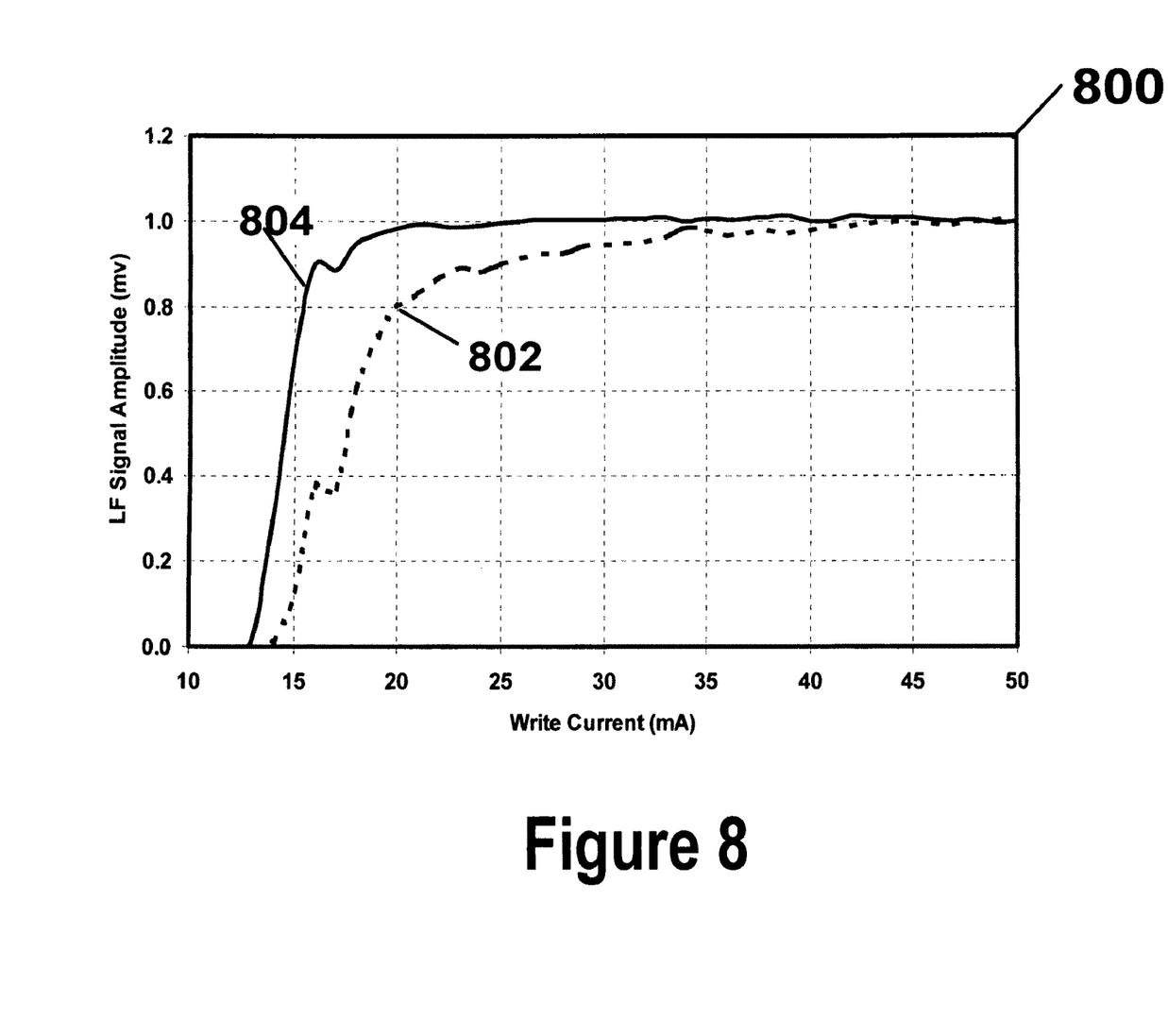

FIG. 8 is a graph of low frequency signal amplitude versus write current, in accordance with an embodiment of the present invention. FIG. 8 provides a comparison of recorded low frequency signal amplitude, as a function of write current, for a longitudinal head of the present invention having a layered upper return pole (curve 804), with that of a conventionally constructed upper return pole of uniform (non-layered) alloy composition (curve 802). As in the high frequency case above, the low frequency signal amplitude of heads of the present invention (curve 804) reach saturation levels at significantly lower write currents than those using conventional non layered upper return poles (curve 802). Thus, FIGS. 7 and 8 demonstrate that longitudinal heads of the present invention have significantly greater recording efficiency than those of the prior art using non-layered upper return poles.

The present invention is not limited by the previous embodiments heretofore described. Rather, the scope of the present invention is to be defined by these descriptions taken together with the attached claims and their equivalents.

What is claimed is:

1. A thin film perpendicular magnetic head comprising:
   a shield structure; and,
   an upper return pole layer, magnetically coupled to said shield structure, said upper return pole layer comprising a plurality of alternating layers of a first magnetic alloy and a second magnetic alloy, layers of said first magnetic alloy having a first thickness, layers of said second magnetic alloy having a second thickness, said first magnetic alloy having an Fe concentration less than 21% by weight, said second magnetic alloy having an Fe concentration greater than 75% by weight, said second thickness greater than 20 times said first thickness.

2. The magnetic head as recited in claim 1, wherein said shield structure is a wrap around shield.

3. The magnetic head as recited in claim 1, wherein said shield structure is a trailing shield.

4. The magnetic head as recited in claim 1, wherein said first and said second magnetic alloys comprise alloys of Ni and Fe.

5. The magnetic head as recited in claim 4, wherein
   said first magnetic alloy comprises Fe concentrations between about 21.2% and 15.2% by weight, Ni concentrations between about 78.8% and 84.8% by weight, and
   said second magnetic alloy comprises Fe concentrations between about 81.7% and 76.7% by weight, Ni concentrations between about 18.3% and 23.3% by weight.

6. The magnetic head as recited in claim 1, wherein said first thickness is between about 50 and 125 angstroms.

7. The magnetic head as recited in claim 6, wherein said second thickness is between about 1000 and 1500 angstroms.

8. The magnetic head as recited in claim 7, wherein said first thickness is about 75angstroms, and said second thickness is about 1500 angstroms.

9. The magnetic head as recited in claim 1, further comprising a lower return pole layer, said lower return pole layer comprising a plurality of alternating layers of said first magnetic alloy and said second magnetic alloy, layers of said first magnetic alloy having said first thickness, and layers of said second magnetic alloy having said second thickness.

10. A thin film longitudinal magnetic head comprising:
    an upper pole tip;
    a lower pole tip;
    a back gap structure;
    an upper return pole layer magnetically coupling said upper pole tip to said back gap structure, said upper return pole layer comprising a plurality of alternating layers of a first magnetic alloy and a second magnetic alloy, layers of said first magnetic alloy having a first thickness, layers of said second magnetic alloy having a second thickness, said first magnetic alloy having an Fe concentration less than 21% by weight, said second magnetic alloy having an Fe concentration greater than 75% by weight, said second thickness greater than 20 times said first thickness; and,
    a lower return pole layer magnetically coupling said lower pole tip to said back gap structure.

11. The magnetic head as recited in claim 10, wherein said first and said second magnetic alloys comprise alloys of Ni and Fe.

12. The magnetic head as recited in claim 11, wherein
    said first magnetic alloy comprises Fe concentrations between about 21.2% and 15.2% by weight, Ni concentrations between about 78.8% and 84.8% by weight, and
    said second magnetic alloy comprises Fe concentrations between about 81.7% and 76.7% by weight, Ni concentrations between about 18.3% and 23.3% by weight.

13. The magnetic head as recited in claim 10, wherein said first thickness is between about 50 and 125 angstroms.

14. The magnetic head as recited in claim 13, wherein said second thickness is between about 1000 and 1500 angstroms.

15. The magnetic head as recited in claim 14, wherein said first thickness is about 75angstroms, and said second thickness is about 1500 angstroms.

16. The magnetic head as recited in claim 10, wherein said lower return pole layer comprises a plurality of alternating layers of said first magnetic alloy and said second magnetic alloy, layers of said first magnetic alloy having said first thickness, and layers of said second magnetic alloy having said second thickness.

17. The magnetic head as recited in claim 16, wherein said first and said second magnetic alloys comprise alloys of Ni and Fe.

18. The magnetic head as recited in claim 17, wherein said first magnetic alloy comprises Fe concentrations between about 21.2% and 15.2% by weight, Ni concentrations between about 78.8% and 84.8% by weight, and said second magnetic alloy comprises Fe concentrations between about 81.7% and 76.7% by weight, Ni concentrations between about 18.3% and 23.3% by weight.

19. The magnetic head as recited in claim 16, wherein said first thickness is between about 50 and 125 angstroms.

20. The magnetic head as recited in claim 19, wherein said second thickness is between about 1000 and 1500 angstroms.

21. A thin film perpendicular magnetic head comprising:
a shield structure; and,
an upper return pole layer, magnetically coupled to said shield structure, said upper return pole layer comprising a plurality of alternating layers of a first NiFe magnetic alloy and a second NiFe magnetic alloy, layers of said first NiFe magnetic alloy having a thickness between about 50 and 125 angstroms, layers of said second NiFe magnetic alloy having a thickness between about 1000 and 1500 angstroms, said first NiFe magnetic alloy having a composition between about 78.8% Ni, 21.2% Fe and 84.8% Ni, 15.2% Fe by weight, said second NiFe magnetic alloy having a composition between about 18.3% Ni, 81.7% Fe and 23.3% Ni, 76.7% Fe by weight.

22. A thin film longitudinal magnetic head comprising:
an upper pole tip;
a lower pole tip;
a back gap structure;
an upper return pole layer magnetically coupling said upper pole tip to said back gap structure, said upper return pole layer comprising a plurality of alternating layers of a first NiFe magnetic alloy and a second NiFe magnetic alloy, layers of said first NiFe magnetic alloy having a first thickness between about 50 and 125 angstroms, layers of said second NiFe magnetic alloy having a second thickness between about 1000 and 1500 angstroms, said first NiFe magnetic alloy having a composition between about 78.8% Ni, 21.2% Fe and 84.8% Ni, 15.2% Fe by weight, said second NiFe magnetic alloy having a composition between about 18.3% Ni, 81.7% Fe and 23.3% Ni, 76.7% Fe by weight; and,
a lower return pole layer magnetically coupling said lower pole tip to said back gap structure, wherein said lower return pole layer comprises a plurality of alternating layers of said first magnetic alloy and said second magnetic alloy, layers of said first magnetic alloy having said first thickness, and layers of said second magnetic alloy having said second thickness.

* * * * *